(12) United States Patent
Frenne et al.

(10) Patent No.: US 11,751,238 B2
(45) Date of Patent: *Sep. 5, 2023

(54) SYSTEM AND METHOD FOR BEAM-BASED PHYSICAL RANDOM-ACCESS

(71) Applicant: Telefonaktiebolaget LM Ericsson (publ), Stockholm (SE)

(72) Inventors: Mattias Frenne, Uppsala (SE); Håkan Andersson, Linköping (SE); Johan Furuskog, Stockholm (SE); Stefan Parkvall, Bromma (SE); Henrik Sahlin, Mölnlycke (SE); Qiang Zhang, Täby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/009,912

(22) Filed: Sep. 2, 2020

(65) Prior Publication Data

US 2020/0404702 A1    Dec. 24, 2020

Related U.S. Application Data

(63) Continuation of application No. 16/395,461, filed on Apr. 26, 2019, now Pat. No. 10,779,323, which is a
(Continued)

(51) Int. Cl.
*H04W 72/04* (2023.01)
*H04W 74/00* (2009.01)
(Continued)

(52) U.S. Cl.
CPC ........ *H04W 74/008* (2013.01); *H04B 7/0408* (2013.01); *H04B 7/0617* (2013.01);
(Continued)

(58) Field of Classification Search
CPC . H04W 74/008; H04W 16/28; H04W 72/046; H04B 7/0408; H04B 7/0617; H04B 7/086; H04L 5/0048
See application file for complete search history.

(56) References Cited

U.S. PATENT DOCUMENTS 5,274,841 A    12/1993    Natarajan
5,303,234 A    4/1994    Kou
(Continued)

FOREIGN PATENT DOCUMENTS

CN    101222261 A    7/2008
CN    101472346 A    7/2009
(Continued)

OTHER PUBLICATIONS

PCT International Search Report for International application No. PCT/SE2014/050986 (dated Feb. 5, 2015).
(Continued)

*Primary Examiner* — Fahmida S Chowdhury
(74) *Attorney, Agent, or Firm* — BAKER BOTTS L.L.P.

(57) ABSTRACT

A method in a wireless device for performing random access to a network node. The method comprises receiving a set of downlink beam-specific reference signals, BRS, from the network node, and determining a preferred BRS based on the received signal power for each BRS. The method also comprises selecting, based on the preferred BRS, a random-access resource to be used for transmitting a random-access attempt to the network node, as well as using the selected random-access resource when transmitting a random-access attempt to the network node, whereby the selection of random-access resource indicates to the network node which downlink beam is preferred by the wireless device to be used for downlink transmissions.

21 Claims, 12 Drawing Sheets

Related U.S. Application Data continuation of application No. 15/725,755, filed on Oct. 5, 2017, now Pat. No. 10,433,335, which is a continuation of application No. 14/400,579, filed as application No. PCT/SE2014/050986 on Aug. 27, 2014, now Pat. No. 9,814,068.

(60) Provisional application No. 61/970,145, filed on Mar. 25, 2014.

(51) Int. Cl.
    *H04B 7/08*     (2006.01)
    *H04W 72/044*     (2023.01)
    *H04B 7/0408*     (2017.01)
    *H04B 7/06*     (2006.01)
    *H04W 16/28*     (2009.01)
    *H04L 5/00*     (2006.01)

(52) U.S. Cl.
CPC ........... *H04B 7/086* (2013.01); *H04L 5/0048* (2013.01); *H04W 16/28* (2013.01); *H04W 72/046* (2013.01)

(56) References Cited

U.S. PATENT DOCUMENTS

| | | | |
|---|---|---|---|
| 5,638,371 A | | 6/1997 | Raychaudhuri |
| 6,078,576 A | | 6/2000 | Schilling |
| 6,347,220 B1 | * | 2/2002 | Tanaka .................. H04B 7/086 |
| | | | 370/320 |
| 6,643,318 B1 | | 11/2003 | Parsa |
| 7,355,962 B2 | | 4/2008 | Li |
| 8,401,094 B2 | | 3/2013 | Pan |
| 8,638,868 B2 | | 1/2014 | Larsson |
| 8,774,150 B1 | | 7/2014 | Jeffery |
| 9,814,068 B2 | | 11/2017 | Frenne |
| 10,433,335 B2 | | 10/2019 | Frenne |
| 2002/0051462 A1 | | 5/2002 | Ertel |
| 2003/0096631 A1 | | 5/2003 | Kayama |
| 2004/0014429 A1 | | 1/2004 | Guo |
| 2004/0204111 A1 | | 10/2004 | Ylitalo |
| 2005/0047530 A1 | | 3/2005 | Lee |
| 2008/0002627 A1 | | 1/2008 | Cha |
| 2009/0129322 A1 | | 5/2009 | Suwa |
| 2009/0170514 A1 | * | 7/2009 | Yokoyama ............ H04W 74/08 |
| | | | 455/450 |
| 2009/0175292 A1 | * | 7/2009 | Noh ...................... H04L 1/1822 |
| | | | 370/462 |
| 2009/0213782 A1 | | 8/2009 | Yee |
| 2010/0080166 A1 | | 4/2010 | Palanki |
| 2010/0097985 A1 | | 4/2010 | Orlik |
| 2011/0032849 A1 | | 2/2011 | Yeung |
| 2011/0065448 A1 | | 3/2011 | Song |
| 2011/0243034 A1 | | 10/2011 | Yamada |
| 2012/0155341 A1 | | 6/2012 | Yamamoto |
| 2012/0307767 A1 | | 12/2012 | Yamada |
| 2013/0072243 A1 | | 3/2013 | Yu |
| 2013/0083774 A1 | | 4/2013 | Son |
| 2013/0201938 A1 | * | 8/2013 | Seol .................. H04W 72/1284 |
| | | | 370/329 |
| 2013/0215844 A1 | | 8/2013 | Seol |
| 2013/0217404 A1 | | 8/2013 | Jung |
| 2013/0242773 A1 | | 9/2013 | Wernersson |
| 2013/0286960 A1 | | 10/2013 | Li |
| 2013/0301567 A1 | * | 11/2013 | Jeong .................. H04B 7/0695 |
| | | | 370/329 |
| 2013/0336174 A1 | | 12/2013 | Rubin |
| 2013/0336176 A1 | | 12/2013 | Rubin |
| 2014/0004897 A1 | * | 1/2014 | Jung .................... H04B 7/0413 |
| | | | 455/509 |
| 2014/0004898 A1 | | 1/2014 | Yu |
| 2014/0010178 A1 | | 1/2014 | Yu |
| 2014/0016576 A1 | | 1/2014 | Noh |
| 2014/0073337 A1 | * | 3/2014 | Hong .................... H04W 16/28 |
| | | | 455/452.1 |
| 2014/0169209 A1 | | 6/2014 | Imamura |
| 2014/0169322 A1 | | 6/2014 | Ouchi |
| 2014/0177531 A1 | | 6/2014 | Imamura |
| 2014/0177607 A1 | | 6/2014 | Li |
| 2014/0206367 A1 | | 7/2014 | Agee |
| 2014/0254515 A1 | | 9/2014 | Kim |
| 2014/0341048 A1 | | 11/2014 | Sajadieh |
| 2015/0230135 A1 | | 8/2015 | Yang |
| 2015/0351061 A1 | * | 12/2015 | Kim ...................... H04W 56/00 |
| | | | 370/252 |
| 2015/0382205 A1 | | 12/2015 | Lee |
| 2019/0150032 A1 | * | 5/2019 | Takeda .................. H04W 72/04 |
| | | | 370/329 |

FOREIGN PATENT DOCUMENTS

| | | |
|---|---|---|
| CN | 103828257 A | 5/2014 |
| EP | 1912454 A1 | 4/2008 |
| EP | 2076087 A2 | 7/2009 |
| JP | 2009-534954 | 9/2009 |
| KR | 20120086331 A | 8/2012 |
| RU | 2 472 321 | 9/2009 |
| WO | 2013021551 A1 | 2/2013 |
| WO | 2015081993 | 12/2013 |
| WO | 2014/007546 | 1/2014 |
| WO | 2014139174 A1 | 9/2014 |

OTHER PUBLICATIONS

3rd Generation Partnership Project: Technical Specification Group Radio Access Network; Evolved Universal Terrestrial Radio Access (E-UTRA); Physical channels and modulation (Release 12) 3GPP TS 36.211 V12.1.0.

Search Report, 2016141578/08 (066564), PCT/SE2014/050986, with English translation, date of completion of search report Dec. 28, 2017, 4 pages.

Official Action, Application No. 2016141578(066564), with English translation, dated Sep. 1, 2018, 7 pages.

Japanese Application No. 2016-558763; Office Action dated Sep. 1, 2018 with English translation 16 pages.

Search report dated Jun. 17, 2019 for corresponding CN2014800793139 application.

BR Office Action received for patent application No. BR112016022044 dated May 28, 2020.

\* cited by examiner

SYSTEM AND METHOD FOR BEAM-BASED PHYSICAL RANDOM-ACCESS

PRIORITY

This application is a continuation, under 35 U.S.C. § 120, of U.S. patent application Ser. No. 16/395,461 filed Apr. 26, 2019 and issued Sep. 15, 2020 as U.S. Pat. No. 10,779,323, which is a continuation, under 35 U.S.C. § 120, of U.S. patent application Ser. No. 15/725,755 filed Oct. 5, 2017 and issued Oct. 1, 2019 as U.S. Pat. No. 10,433,335, which is a continuation, under 35 U.S.C. § 120, of U.S. patent application Ser. No. 14/400,579 filed Nov. 12, 2014 and issued Nov. 7, 2017 as U.S. Pat. No. 9,814,068, which is a U.S. National Stage Filing under 35 U.S.C. § 371 of International Patent Application Serial No. PCT/SE2014/050986, filed Aug. 27, 2014 and entitled "System and Method for Beam-Based Physical Random-Access," which claims priority to U.S. Provisional Patent Application No. 61/970,145 filed Mar. 25, 2014, all of which are hereby incorporated by reference in their entirety.

TECHNICAL FIELD

Particular embodiments relate generally to wireless communications and more particularly to a system and method for beam-based physical random access.

BACKGROUND

The current fourth generation (4G) wireless access within the 3rd generation partnership project (3GPP) long-term evolution (LTE) is based on orthogonal frequency-division multiplexing (OFDM) in downlink and discrete Fourier transform (DFT) spread OFDM, also known as single carrier frequency division multiple access (SC-FDMA), in uplink.

A candidate for a fifth generation (5G) air interface is to scale the current LTE air interface, which is limited to 20 MHz bandwidth, N times in bandwidth with 1/N times shorter transmission-time duration. A typical value may be N=5 so that the carrier has 100 MHz bandwidth and 0.1 millisecond slot lengths. With this approach many functions in LTE can remain the same, which would simplify the standardization effort and allow for a reuse of technology components.

The carrier frequency for an anticipated 5G system could be higher than current 4G systems. Values in the range of 10-80 GHz have been discussed. At such high frequencies, it is suitable to use an array antenna to achieve beamforming gain. Since the wavelength is small, e.g., less than 3 cm, an array antenna with a large number of antenna elements can be fitted into an antenna enclosure with a size comparable to 3G and 4G base station antennas of today.

FIG. 1 is a block diagram illustrating a radio network 100 that includes one or more wireless devices 110A-C, network nodes 115A-C (shown in FIG. 1 as base stations), radio network controller 120, and packet core network 130.

A wireless device 110 may communicate with a network node 115 over a wireless interface. For example, wireless device 110 may transmit wireless signals to network node 115 and/or receive wireless signals from network node 115. The wireless signals may contain voice traffic, data traffic, control signals, and/or any other suitable information.

FIG. 2 is a block diagram illustrating a network 200 that includes three transmission points (TP) 202 for communicating with wireless device 110 or other user equipment (UE) via array antennas generating multiple beams 203. A transmission point may include any network node such as network node 115 shown in FIG. 1.

The beams generated by array antennas may typically be highly directive and give beamforming gains of 20 dB or more due to that a large number of antenna elements participate in forming a beam. This means that each beam is relatively narrow in angle, a half-power beam width (HPBW) of 5 degrees is not unlikely. Hence, a sector of a network node, such as a base station, must be covered with a large number of beams.

Where a system such as system 200 of FIG. 2 includes multiple transmission nodes, each node may have an array antenna capable of generating many beams 203 with small HPBW. These nodes may then, for instance, use one or multiple carriers, so that a total transmission bandwidth of multiples of hundreds of MHz can be achieved leading to downlink (DL) peak user throughputs reaching as high as 10 Gbit/s or more.

In LTE access procedures, a wireless device, or UE, first searches for a cell using a cell search procedure, where unique primary and secondary synchronization signals (PSS and SSS, respectively) are transmitted from each network node, or eNodeB in the context of LTE. When a cell has been found, the wireless device can proceed with further steps to become associated with this cell, which is then known as the serving cell for this wireless device. After the cell is found, the wireless device can read system information (transmitted on the physical broadcast channel), known as the master information block (MIB), which is found in a known time-frequency position relative to the PSS and SSS locations. After MIB is detected, the system frame number (SFN) and the downlink system bandwidth are known.

In LTE, as in any communication system, a mobile terminal may need to contact the network without having a dedicated resource in the uplink (UL) from wireless device to network node, or base station. To handle this, a random-access procedure is available where a wireless device that does not have a dedicated UL resource may transmit a signal to the base station.

FIG. 3 is a block diagram illustrating random-access preamble transmission 300. The first message of this procedure is typically transmitted on a special communication resource reserved for random access, a physical random-access channel (PRACH). This channel can for instance be limited in time and/or frequency (as in LTE).

The communication resources available for PRACH transmission are provided to the wireless devices as part of the broadcasted system information in system information block two (SIB-2) or as part of dedicated radio-resource control (RRC) signaling in case of, e.g., handover.

The resources consist of a preamble sequence and a time/frequency resource. In each cell, there are 64 preamble sequences available. Two subsets of the 64 sequences are defined, where the set of sequences in each subset is signaled as part of the system information.

FIG. 4 is a signaling diagram illustrating a contention-based random-access procedure used in LTE. The wireless device 110 starts the random-access procedure by randomly selecting one of the preambles available for contention-based random access. At step 402, the wireless device 110 transmits a random-access preamble (MSG1) on the physical random-access channel (PRACH) to network node 115.

At step 404, the radio-access network (RAN) acknowledges any preamble it detects by transmitting, from network node 115, a random-access response (MSG2) including an initial grant to be used on the uplink shared channel, a radio network temporary identifier (TC-RNTI), and a time alignment (TA) update. When receiving the response, the wireless device 110 uses the grant to transmit a scheduled transmission message (MSG3) to network node 115 at step 406.

The procedure ends with the RAN resolving any preamble contention that may have occurred for the case that multiple wireless devices transmitted the same preamble at the same time. This can occur since each wireless device 110 randomly selects when to transmit and which preamble to use. If multiple wireless devices select the same preamble for the transmission on PRACH, there will be contention that needs to be resolved through a contention resolution message (MSG4), which may be transmitted in step 408.

FIG. 4 also illustrates transmissions of hybrid automatic repeat request acknowledgement messages (HARQ ACK).

FIG. 5 is a block diagram illustrating contention-based random access, where there is contention between two wireless devices. Specifically, two wireless devices 110A, 110B, transmit the same preamble, $p_5$, at the same time. A third wireless device 110C also transmits at the same time, but since it transmits with a different preamble, $p_1$, there is no contention between this wireless device and the other two wireless devices.

A wireless device 110 can also perform non-contention based random access. FIG. 6 is a flowchart illustrating the procedure for a wireless device 110 to perform contention-free random access based on reception of a random access (RA) order message from network node 115. Non-contention based random access is typically used in handover between two network nodes, such as any two of the network nodes 115A, 115B, 115C illustrated in FIG. 1. In this case, the order for a non-contention based random access is transmitted from a source network node while the random access preamble (MSG1) is received at another target network node, which also transmits the random access response (MSG2). Similar to the contention-based random access, the random-access response (MSG2) is transmitted in the downlink (DL) to the wireless device 110 following successful detection of a random-access preamble (MSG1).

SUMMARY

In a beam-based radio-access system, it is a problem for the network side, i.e., network node 115, to select in which beam to transmit the random-access responses, i.e., MSG2, to the wireless device 110.

Furthermore, it is a complexity problem for the network side to detect random-access preambles, i.e., MSG1, in a beam-based radio-access system since the network node does not know which receive beam is the best to receive the preamble, and thus the network node 115 needs to repeat the search in each beam. Using the uplink received best beam to also transmit downlink signals to the same wireless device requires well-calibrated uplink and downlink radio-frequency chains (RF) in the network in order to ensure that the advantageous reception conditions over the uplink received best beam is reflected also over downlink, which is costly to implement.

An object of the present disclosure is to provide at least a wireless device, a network node, and methods for random access, which seek to mitigate, alleviate, or eliminate one or more of the above-identified deficiencies in the art and disadvantages singly or in any combination.

This object is obtained by a method in a wireless device for performing random access to a network node. The method comprises receiving a set of downlink beam-specific reference signals, BRS, from the network node, and determining a preferred BRS based on the received signal power for each BRS. The method also comprises selecting, based on the preferred BRS, a random-access resource to be used for transmitting a random-access attempt to the network node, and using the selected random-access resource when transmitting a random-access attempt to the network node, whereby the selection of random-access resource indicates to the network node which downlink beam is preferred by the wireless device to be used for downlink transmissions.

Hereby, since the network, i.e., the network node, knows the beam to use for random-access response, the coverage of random-access responses is improved. Also, the random-access procedure can be completed earlier, which improves latency and reduces interference in the network.

Another technical advantage may be that there is no need to have calibrated and aligned RF for uplink and downlink which reduces implementation cost and power consumption. The object is also obtained by a method in a network node for supporting random access from a wireless device. The method comprises transmitting a set of beam-specific reference signals (BRS), and detecting a preamble in a signal received from the wireless device. The preamble detection indicates a BRS preferred by the wireless device. The method also comprises transmitting a random-access response in the same beam, and/or beam direction, and/or with the same beamforming weights, as the preferred BRS indicated by the preamble detection.

Again, since the network, i.e., the network node, knows the beam to use for random-access response, the coverage of random-access responses is improved. Also, the random-access procedure can be completed earlier, which improves latency and reduces interference in the network.

Another technical advantage may be that there is no need to have calibrated and aligned RF for uplink and downlink which reduces implementation cost and power consumption.

A further technical advantage may be that computational complexity in a network node, such as an eNodeB, is reduced by the present teaching. A random-access preamble detector in a network node only needs to search for a sub-set of preamble sequences in each uplink receiver direction. This subset equals to those random-access sequences that are mapped to the same downlink transmission beam (or spatial direction) as the receiver uplink beam (or spatial direction).

Some embodiments may benefit from some, none, or all of the above-mentioned advantages. Other technical advantages may be readily ascertained by one of ordinary skill in the art.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Particular embodiments are described below with reference to FIGS. 7-12 of the drawings, like numerals being used for like and corresponding parts of the various drawings.

Figure 7:
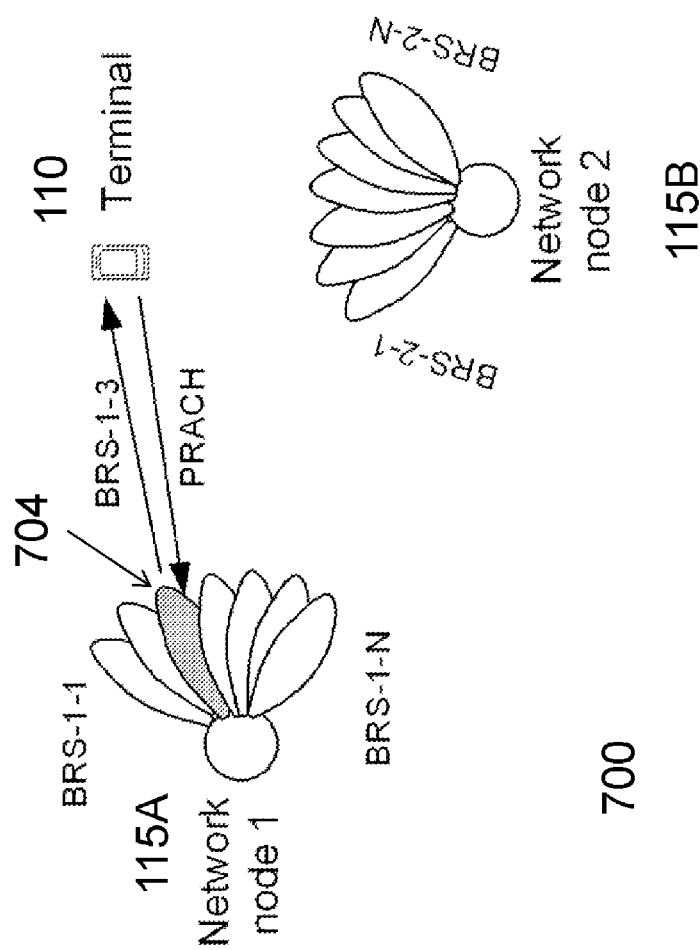
FIG. 7 is a block diagram illustrating certain embodiments of a system for beam selection based on received signal strength in the downlink.

FIG. 7 illustrates a system 700 that includes a wireless device 110 (shown in FIG. 7 as a 'terminal') operable to select a beam 704 based on received signal strength in the downlink (DL), according to certain embodiments. As depicted, system 700 includes multiple network nodes 115A, 115B, each transmitting unique reference signals per beam. In a particular embodiment, the two network nodes 115A, 115B may be two transmission points (TP) capable of performing multi-beam transmissions, in the same cell (same physical cell ID), or it may be nodes belonging to different cells.

In a particular embodiment, wireless device 110 can detect the preferred downlink beam (and eventually network node). In the depicted example, wireless device 110 has detected a beam-specific reference signal (BRS-1-3) from network node 1. Wireless device 110 may then select a PRACH signal to transmit in the uplink so that the network gets information about which BRS is the "best" for the wireless device 110 and thus the network knows which downlink beam to use for subsequent messages such as the random-access channel (RACH) response. Note that the preambles associated with network node 115A can also be detected by network node 115B, if the two network nodes are coordinated.

Thus, a PRACH signal to transmit in the uplink is selected by the UE or wireless device 110 based on transmission conditions in the downlink from the network node 115 to the wireless device 110.

As mentioned in the background section, the PRACH resources consist of a preamble sequence and a time/frequency resource. A PRACH resource can be taken from a subset of the set of all available preambles and/or the wireless device can transmit the preamble in a certain frequency band within the system bandwidth. When the network has detected the preamble transmitted from the wireless device, it knows which downlink beam is preferred to be used for downlink transmissions such as the following RACH response.

Thus, the preamble and/or the time/frequency resource used for transmitting the preamble, is selected by the UE, or wireless device 110, based on transmission conditions in the downlink from the network node 115 to the wireless device 110.

Figure 8:
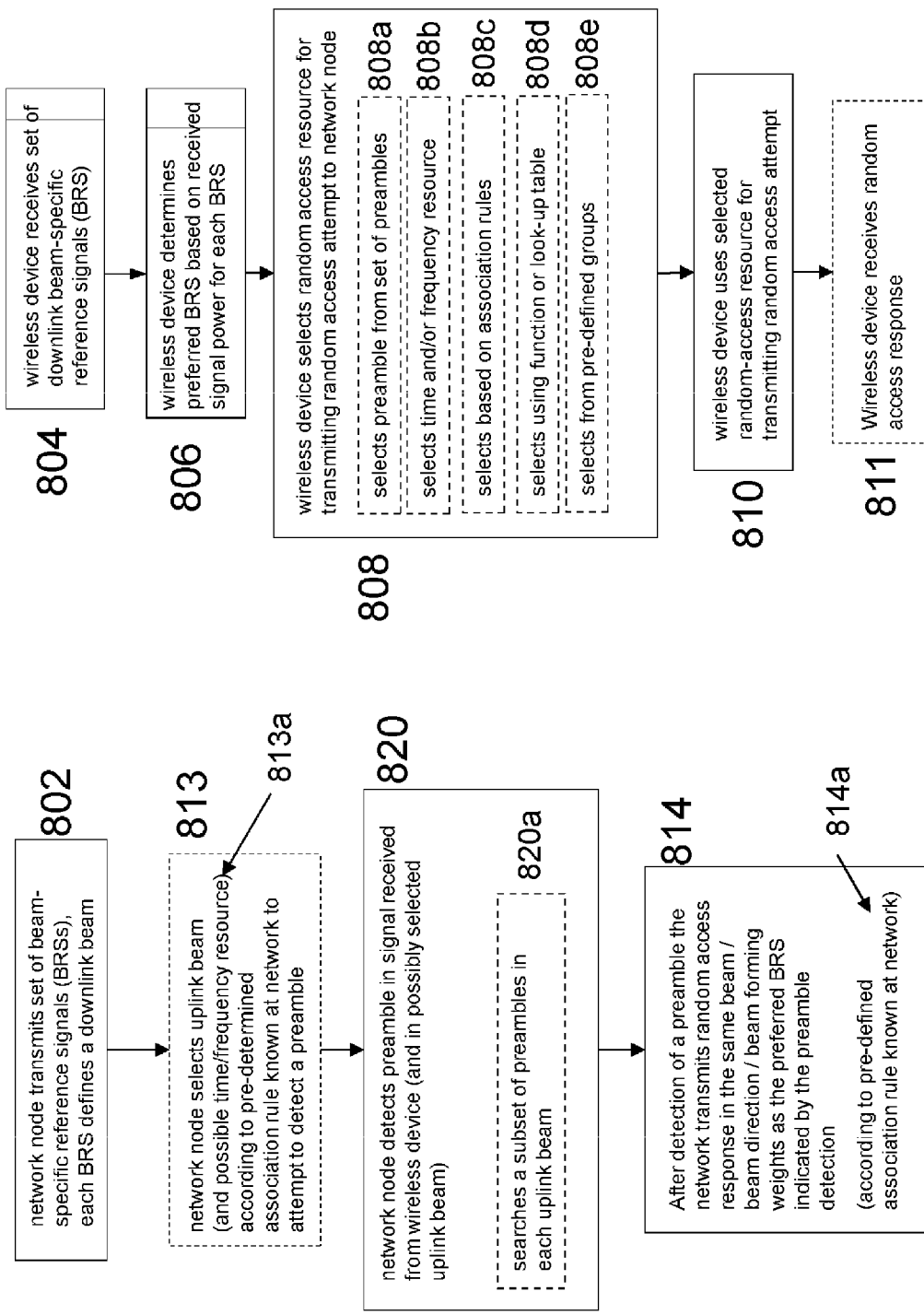
FIG. 8 is a flowchart illustrating certain embodiments for performing selection of a preferred downlink beam.

FIG. 8 illustrates a flowchart depicting exemplary method steps performed for the selection of a preferred downlink beam, according to certain embodiments. Specifically, the right hand side of the flowchart depicts the steps that may be performed by wireless device 110, and the left hand side depicts the steps that may be performed by network node 115, according to certain embodiments.

More specifically, the right hand side illustrates a method in a wireless device 110 for performing random access to a network node 115. The method comprises receiving 804 a set of downlink beam-specific reference signals, BRS, from the network node 115. The method also comprises determining 806 a preferred BRS based on the received signal power for each BRS, as well as selecting 808, based on the preferred BRS, a random-access resource to be used for transmitting a random-access attempt to the network node 115. The method further comprises using 810 the selected random-access resource when transmitting a random-access attempt to the network node 115, whereby the selection of random-access resource indicates to the network node which downlink beam is preferred by the wireless device to be used for downlink transmissions.

The left hand side of the flowchart shown in FIG. 8 illustrates a method in a network node 115 for supporting random access from a wireless device 110. The method comprises transmitting 802 a set of beam-specific reference signals (BRS). The method also comprises detecting 820 a preamble in a signal received from the wireless device 110, said preamble detection indicating a BRS preferred by said wireless device.

The method further comprises transmitting 814 a random-access response in the same be and/or beam direction, and/or with the same beamforming weights, as the preferred BRS indicated by the preamble detection.

Of course, the network node 115 will attempt to detect more than one single preamble during a given time duration, and thus will sequentially or in parallel attempt to detect all relevant preambles in the communication system.

The methods illustrated in FIG. 8 may begin at step 802 when network node 115 (eNB, base station) may transmit a set of beam-specific reference signals in the downlink. The signals may be received by the wireless device at step 804. Wireless device 110 may then perform measurements on these different (preferably orthogonal) reference signals and then determine a preferred BRS at step 806. This can be done by measuring reference signal received power (RSRP). The reference signal can be beamformed synchronization signals (Primary Synchronization Signal PSS/Secondary Synchronization Signal SSS), beamformed channel state information reference signals (CSI-RS), beamformed discovery signals or it can be newly designed beam-specific reference signal (BRS) sequences. Herein, we denote and classify the beam-specific reference signals as BRS, for simplicity.

The beam-specific reference signals are assumed known by e.g. specification or from (broadcasted) system information, before the wireless device can start measuring and identifying the preferred downlink beam. However, in one embodiment, configuration signaling takes place prior to the identification but on non-beam-based legacy system such as LTE. In practice, the wireless device detects a preferred beam-specific reference signal from a set of beam-specific reference signals, so the wireless device is not aware of the actual beam direction of beam radiation pattern, or beam forming weights used by the transmitter side which is entirely implementation specific.

At step 808, wireless device 110 selects random-access resource for transmitting random-access attempt to the network node 115.

According to some embodiments, the selecting 808 comprises selecting 808a a preamble, from a set of preambles, to be used for transmitting the random-access attempt.

According to some embodiments, the selecting 808 comprises selecting 808b a time and/or frequency resource to be used for transmitting the random-access attempt. According to such embodiments, the PRACH resource (which potentially is one of multiple resources distributed in time or frequency) to use when transmitting the preamble depends on the detected preferred BRS. Hence, the network will know which BRS was preferred from the wireless device, or UE, side from which band and/or time-domain location the network has detected the preamble in the uplink. And thus, the network knows the direction in which to transmit the random-access response (MSG2) since it is the same as the preferred BRS. This embodiment can be combined with the previous, comprising selecting a preamble, so that both a subset of preambles and a certain frequency band and/or subframe, is used to transmit the preamble.

According to further aspects, the selecting 808 comprises selecting 808c the random-access resource based on pre-defined association rules, known at the wireless device.

In one embodiment, after determining a preferred downlink BRS, the wireless device uses a function or look-up table, specified in a manual or standard or given by prior broadcast signaling or configured by dedicated signaling (such as RRC signaling) on an assisting legacy network, to select 808d a random-access preamble from a set of preambles. The wireless device then uses this selected preamble in its random-access attempt in step 810.

The network can then from detecting the PRACH preamble (at step 820) determine which downlink beam the wireless device has found to be strongest and it will thus preferably use this when transmitting the random-access response message(s) at step 814. The network has several choices in selecting the beam-forming weights for the random-access response messages. It can simply choose the same beamforming weights as was used when forming the beam to transmit the BRS that was preferred by the wireless device.

According to some embodiments, the network node transmits 814a the random-access response according to one or more pre-defined association rules known at the network node 115.

Alternatively, a wider beam or more narrow beam or a beam with lower side lobes can be generated by using different beamforming weights for the following random-access response than for the BRS transmission. It may be so that BRS are transmitted with larger HPBW and physical downlink shared channel (PDSCH) beams (like random-access responses) are transmitted in beams with smaller HPBW. In any case, the beam direction of the beam of the preferred BRS gives the network information of the pointing direction of the following random-access response beam (even though the beamforming weights are not exactly the same).

According to some aspects, the method illustrated in FIG. 8 further comprises selecting 813 an uplink beam for detecting 820 the preamble according to one or more pre-defined association rules between preambles and uplink beams known at the network node 115.

According to some further aspects, the method further comprises selecting 813a a time and/or frequency resource for preamble detection according to one or more pre-defined association rules between preambles and time/frequency resources known at the network node 115.

In some embodiments, the set of preambles and resources are divided into groups, where each group is associated with a beam-specific reference signal (BRS). The association between BRS and preamble may be given by standard specification. The wireless device selects 808e, randomly or otherwise, a preamble from the associated group to use in its random-access attempt. The group could for example be all available preamble sequences using one PRACH resource.

If the set of available preambles are divided into too many smaller groups, such that the number of preambles in each group is small, this may lead to larger probability of RACH collision. In a related embodiment, a set (more than one) of BRS are all associated with a group of PRACH preambles. The network can then use the set of BRS associated with the same group of PRACH preambles in adjacent downlink beams (adjacent in downlink transmitted beam direction). In case there are many BRS, then the set of available PRACH preambles associated with the detected best BRS is rather large so the preamble collision probability (in case of contention-based random access) is maintained low.

In yet a further variant of this embodiment, some BRS and preambles can be associated to multiple groups. The beam direction can be partly overlapping between two groups. If the preamble belongs to the two groups, the network node should use the overlapping beam directions between these two groups to transmit the DL RACH response.

In a further network embodiment, the network only searches 820a the subset of preambles in each uplink beam, for which the associated BRS is transmitted in downlink. Each BRS points out the subset of preambles to be used in PRACH preamble receiver. Hence, there is a reduction in network preamble detection complexity. This solution requires however that the relation between uplink receive beam and downlink transmit beam is known, by e.g. RF calibration at the network side.

In yet another embodiment, preamble sequences and PRACH resources are reused for BRSs associated with beams with sufficient angular separation so that they can be discriminated by using different uplink beams.

According to some aspects, the wireless device receives the random-access response from the network node at step 811.

Figure 1:
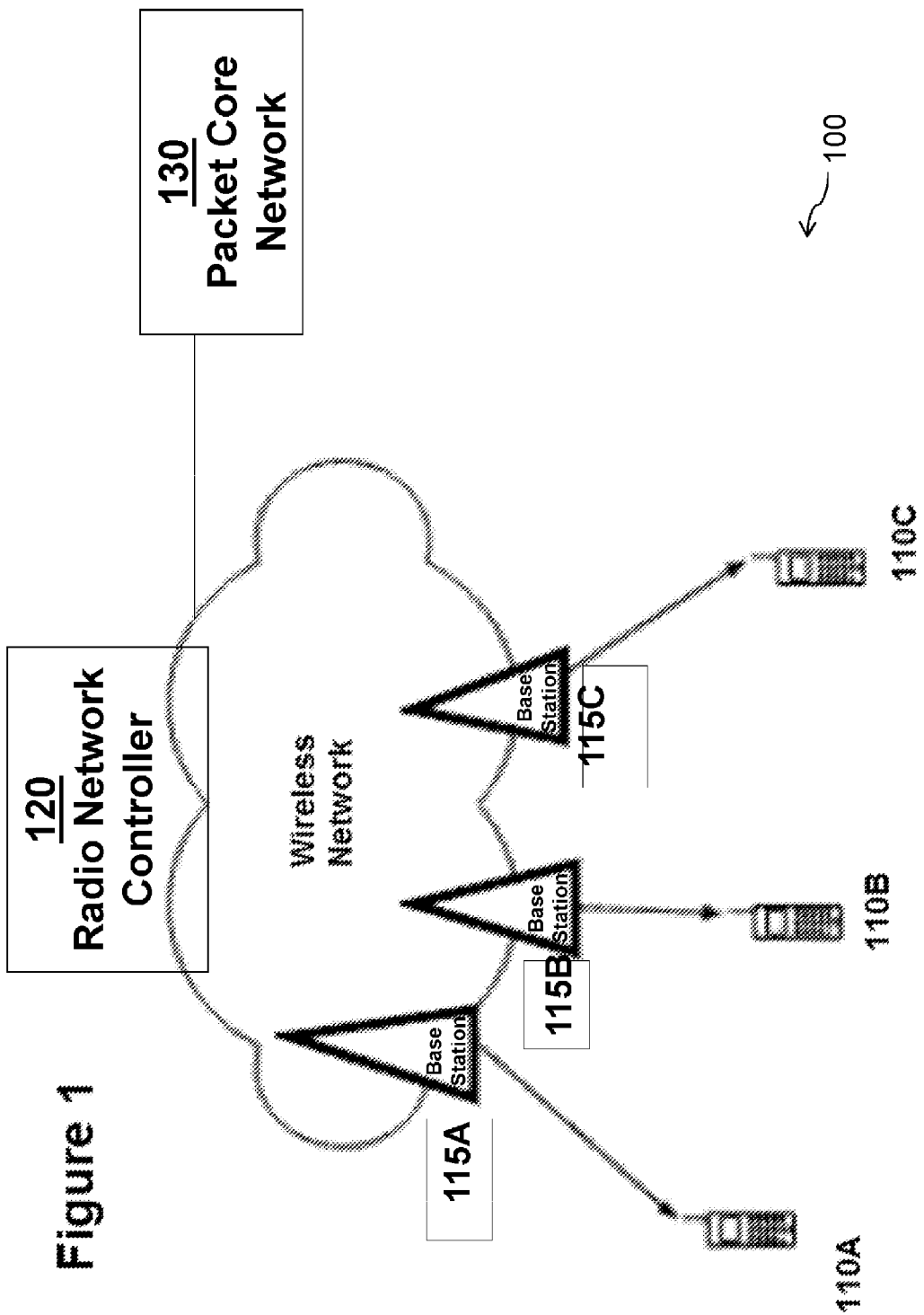
FIG. 1 is a block diagram illustrating a radio network.
Figure 2:
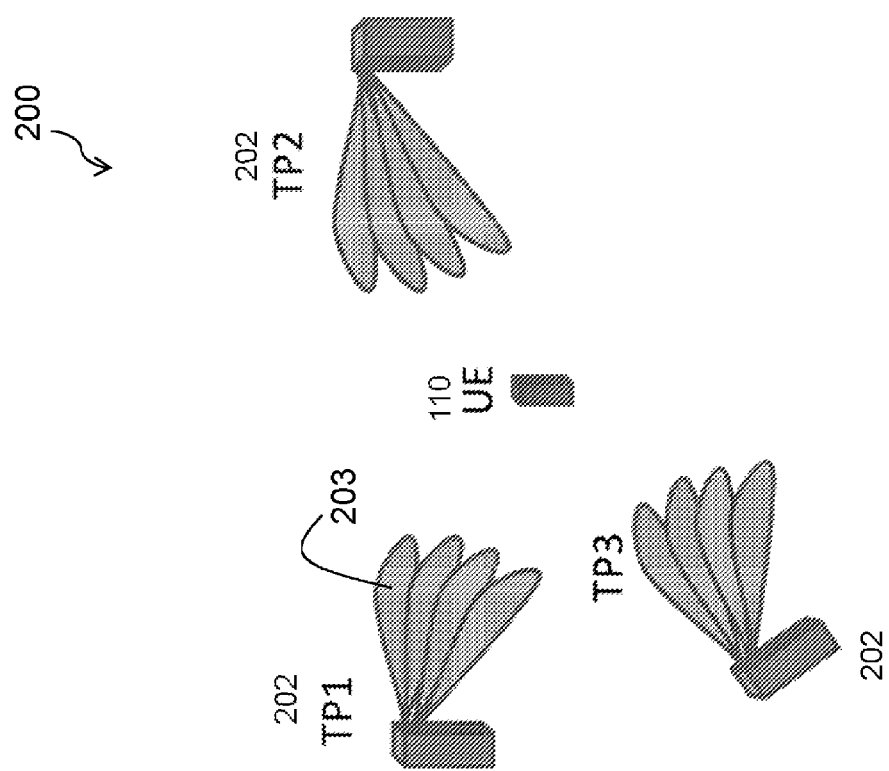
FIG. 2 is a block diagram illustrating a 5G radio network.
Figure 3:
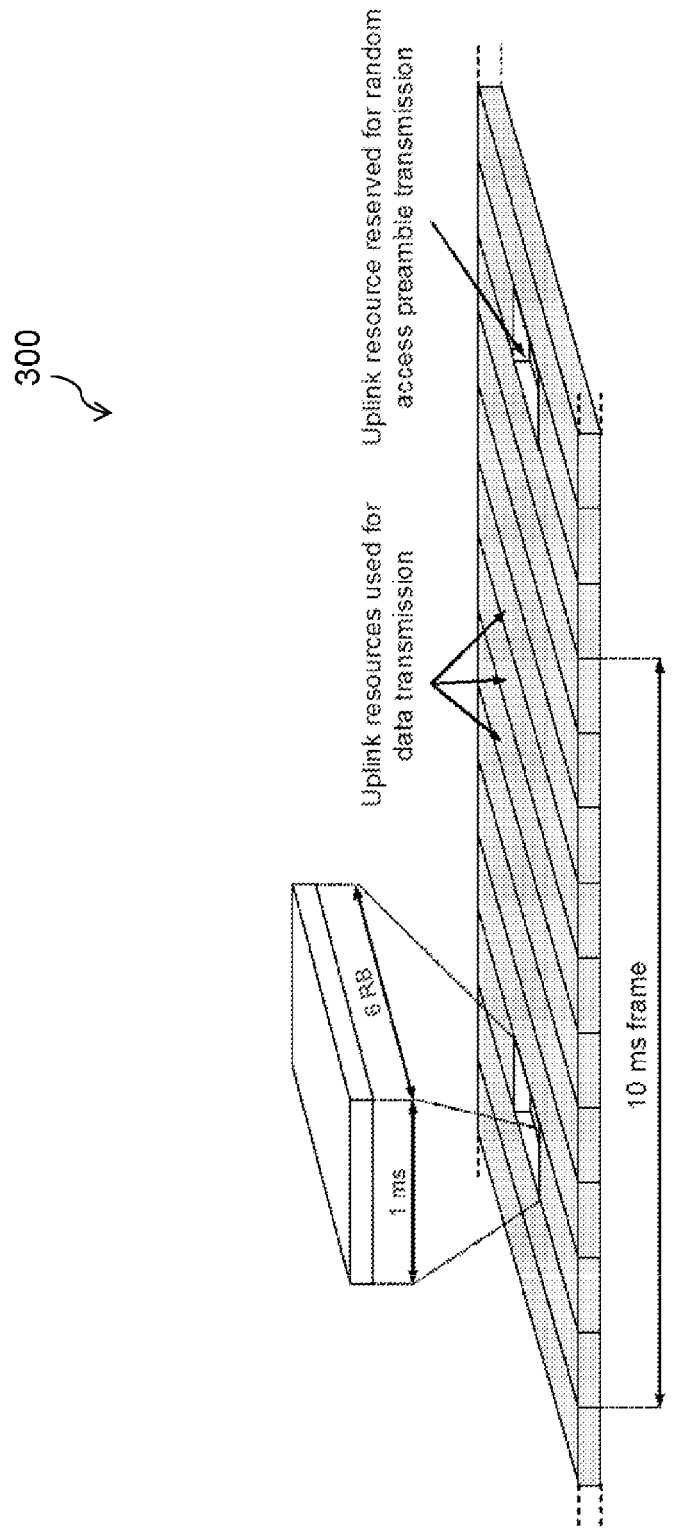
FIG. 3 is a block diagram illustrating random-access preamble transmission.
Figure 4:
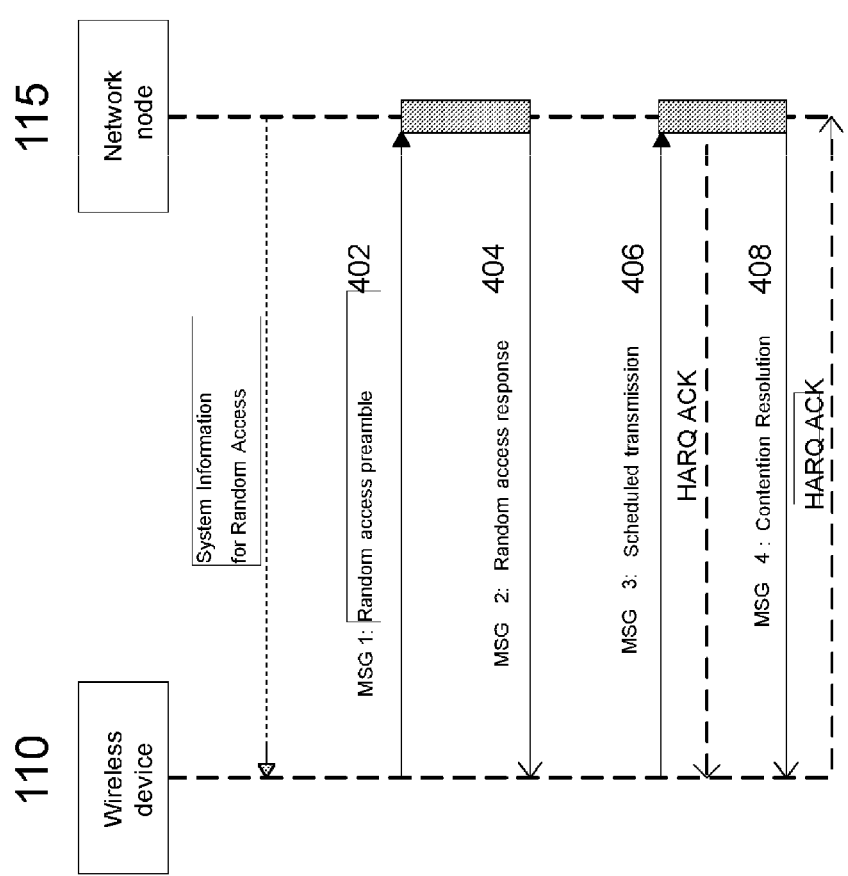
FIG. 4 is a flow chart illustrating contention-based random-access procedure.
Figure 5:
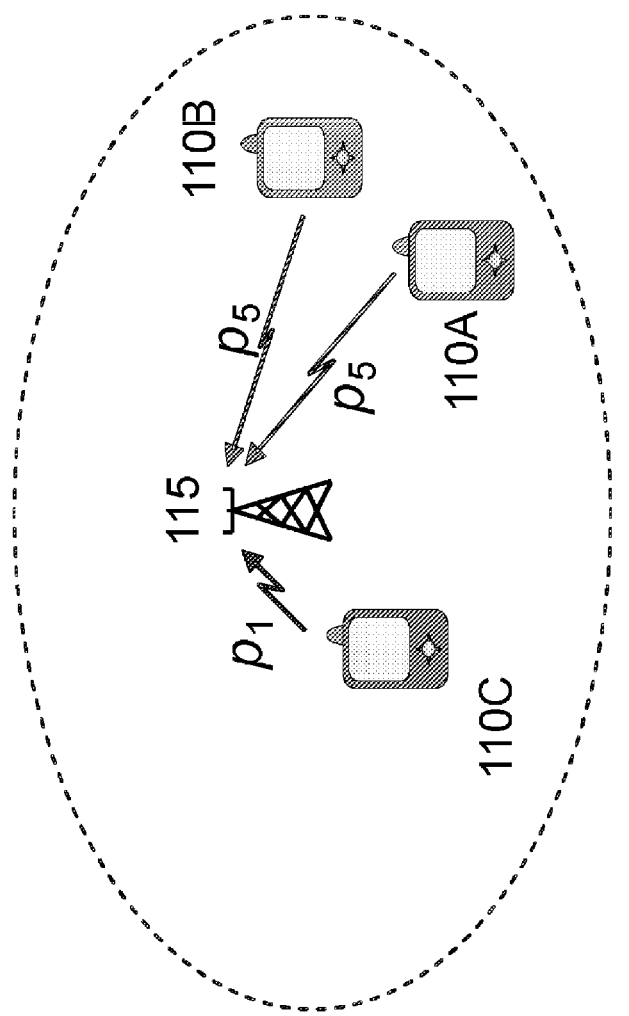
FIG. 5 is a block diagram illustrating a system for performing a contention-based random-access procedure.
Figure 6:
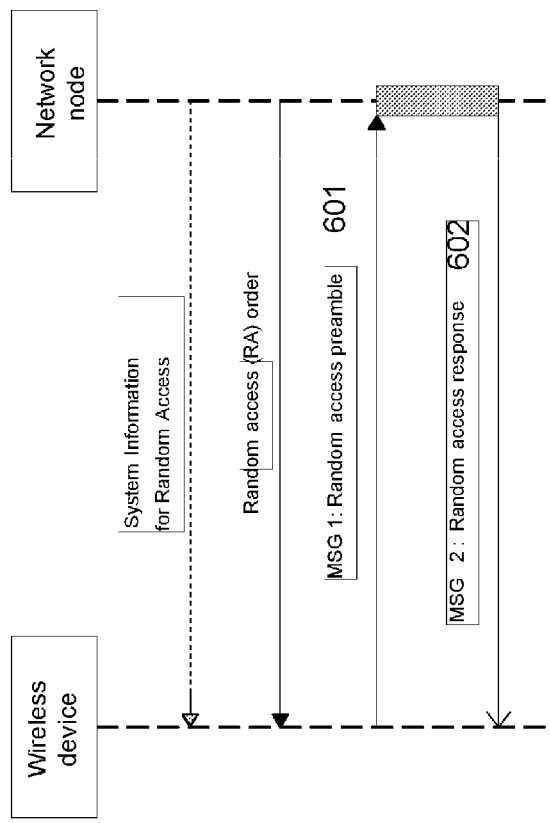
FIG. 6 is a flow chart illustrating contention-free random-access performance by wireless device.

Wireless device 110 and network node 115 illustrated, e.g., in FIG. 1, may use any suitable radio-access technology, such as long-term evolution (LTE), LTE-Advanced, universal mobile telecommunications system (UMTS), high speed packet access (HSPA), global system for mobile communications (GSM), cdma2000, WiMax, WiFi, another suitable radio-access technology, or any suitable combination of one or more radio-access technologies. For purposes of example, various embodiments may be described within the context of certain radio-access technologies. However, the scope of the disclosure is not limited to the examples and other embodiments could use different radio-access technologies. Each of wireless device 110, network node 115, radio network controller 120, and packet core network 130 may include any suitable combination of hardware and/or software. Examples of particular embodiments of wireless device 110, network node 115, and network nodes (such as radio network controller 120 or packet core network 130) are described with respect to FIGS. 9, 10, and 11 below, respectively.

Figure 9:
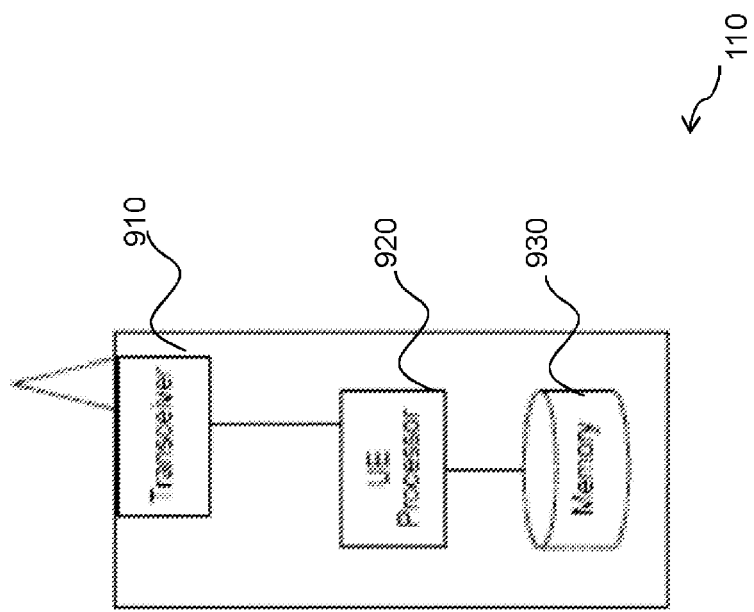
FIG. 9 is a block diagram illustrating certain embodiments of a wireless device.

FIG. 9 is a block diagram illustrating certain embodiments of a UE or wireless device 110. Examples of wireless device 110 include a mobile phone, a smart phone, a personal digital assistant (PDA), a portable computer, e.g., laptop, tablet, a sensor, a modem, a machine type communication (MTC) device/machine-to-machine (M2M) device, laptop-embedded equipment (LEE), laptop-mounted equipment (LME), universal serial bus (USB) dongles, a device-to-device capable device, or another device that can provide wireless communication. Wireless device 110 may also be a radio communication device, target device, device to device UE, machine type UE or wireless device capable of machine-to-machine communication, a sensor equipped with wireless device, iPad, tablet, mobile terminals, smart phone, laptop-embedded equipped (LEE), laptop-mounted equipment (LME), USB dongles, customer premises equipment (CPE), etc.

Though the terms UE and wireless device 110 are used predominantly herein, the equipment may also be referred to as a station (STA), a device, or a terminal in some embodiments. As depicted, wireless device 110 includes transceiver 910, processor 920, and memory 930.

In some embodiments, transceiver 910 facilitates transmitting wireless signals to and receiving wireless signals from network node 115, e.g., via an antenna, processor 920 executes instructions to provide some or all of the functionality described above as being provided by wireless device 110, and memory 930 stores the instructions executed by processor 920.

Processor 920 may include any suitable combination of hardware and software implemented in one or more modules to execute instructions and manipulate data to perform some or all of the described functions of wireless device 110. In some embodiments, processor 920 may include, for example, one or more computers, one or more central processing units (CPUs), one or more microprocessors, one or more applications, and/or other logic.

Memory 930 is generally operable to store instructions, such as a computer program, software, an application including one or more of logic, rules, algorithms, code, tables, etc. and/or other instructions capable of being executed by a processor. Examples of memory 930 include computer memory (for example, random access memory (RAM) or read only memory (ROM)), mass storage media (for example, a hard disk), removable storage media (for example, a compact disk (CD) or a digital video disk (DVD)), and/or any other volatile or non-volatile, non-transitory computer-readable and/or computer-executable memory devices that store information.

Other embodiments of wireless device 110 may include additional components beyond those shown in FIG. 9 that may be responsible for providing certain aspects of the wireless device's functionality, including any of the functionality described above and/or any additional functionality (including any functionality necessary to support the solution described above).

Figure 10:
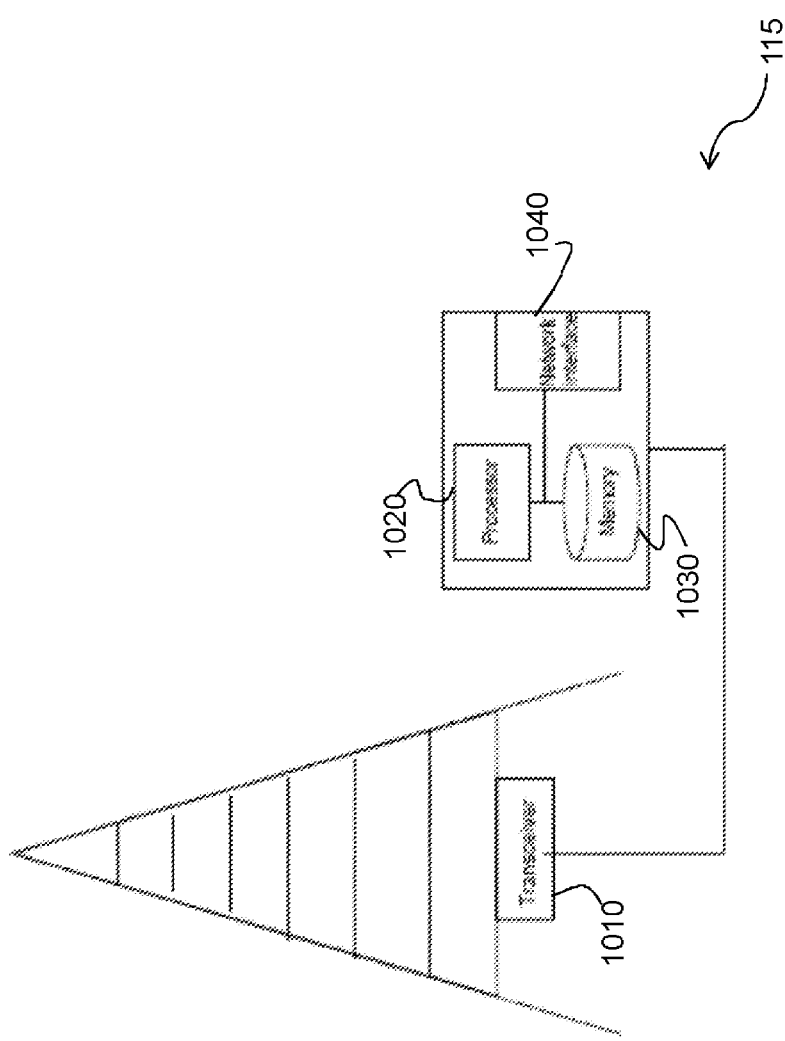
FIG. 10 is a block diagram illustrating certain embodiments of a network node.

FIG. 10 is a block diagram illustrating certain embodiments of a network node 115. Examples of network node 115 include an eNodeB, a node B, a base station, a wireless access point (e.g., a Wi-Fi access point), a low power node, a base transceiver station (BTS), transmission points, transmission nodes, remote RF unit (RRU), remote radio head (RRH)/etc. Network nodes 115 may be deployed throughout network 100 as a homogenous deployment, heterogeneous deployment, or mixed deployment. A homogeneous deployment may generally describe a deployment made up of the same (or similar) type of network nodes 115 and/or similar coverage and cell sizes and inter-site distances. A heterogeneous deployment may generally describe deployments using a variety of types of network nodes 115 having different cell sizes, transmit powers, capacities, and inter-site distances. For example, a heterogeneous deployment may include a plurality of low-power nodes placed throughout a macro-cell layout. Mixed deployments may include a mix of homogenous portions and heterogeneous portions.

Network node 115 may include one or more of transceiver 1010, processor 1020, memory 1030, and network interface 1040. In some embodiments, transceiver 1010 facilitates transmitting wireless signals to and receiving wireless signals from wireless device 110 (e.g., via an antenna), processor 1020 executes instructions to provide some or all of the functionality described above as being provided by a network node 115, memory 1030 stores the instructions executed by processor 1020, and network interface 1040 communicates signals to backend network components, such as a gateway, switch, router, Internet, public switched telephone network (PSTN), packet core network 130, radio network controllers 120, etc.

Processor 1020 may include any suitable combination of hardware and software implemented in one or more modules to execute instructions and manipulate data to perform some or all of the described functions of network node 115. In some embodiments, processor 1020 may include, for example, one or more computers, one or more central processing units (CPUs), one or more microprocessors, one or more applications, and/or other logic.

Memory 1030 is generally operable to store instructions, such as a computer program, software, an application including one or more of logic, rules, algorithms, code, tables, etc. and/or other instructions capable of being executed by a processor. Examples of memory 1030 include computer memory (for example, random access memory (RAM) or read only memory (ROM)), mass storage media (for example, a hard disk), removable storage media (for example, a compact disk (CD) or a digital video disk (DVD)), and/or or any other volatile or non-volatile, non-transitory computer-readable and/or computer-executable memory devices that store information.

In some embodiments, network interface 1040 is communicatively coupled to processor 1020 and may refer to any suitable device operable to receive input for network node 115, send output from network node 115, perform suitable processing of the input or output or both, communicate to other devices, or any combination of the preceding. Network interface 1040 may include appropriate hardware (e.g., port, modem, network interface card, etc.) and software, including protocol conversion and data processing capabilities, to communicate through a network.

Other embodiments of network node 115 may include additional components beyond those shown in FIG. 10 that may be responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

Also in some embodiments generic terminology, "network node" or simply "network node (NW node)", may be used. The terms may refer to any kind of network node which may comprise of base station, radio base station, base transceiver station, base station controller, network controller, evolved Node B (eNB), Node B, RNC, relay node, positioning node, E-SMLC, location server, repeater, access point, radio access point, remote radio unit (RRU), remote radio head (RRH), multi-standard radio (MSR) radio node such as MSR BS nodes in distributed antenna system (DAS), SON node, O&M, OSS, MDT node, Core network node, MME etc.

Figure 11:
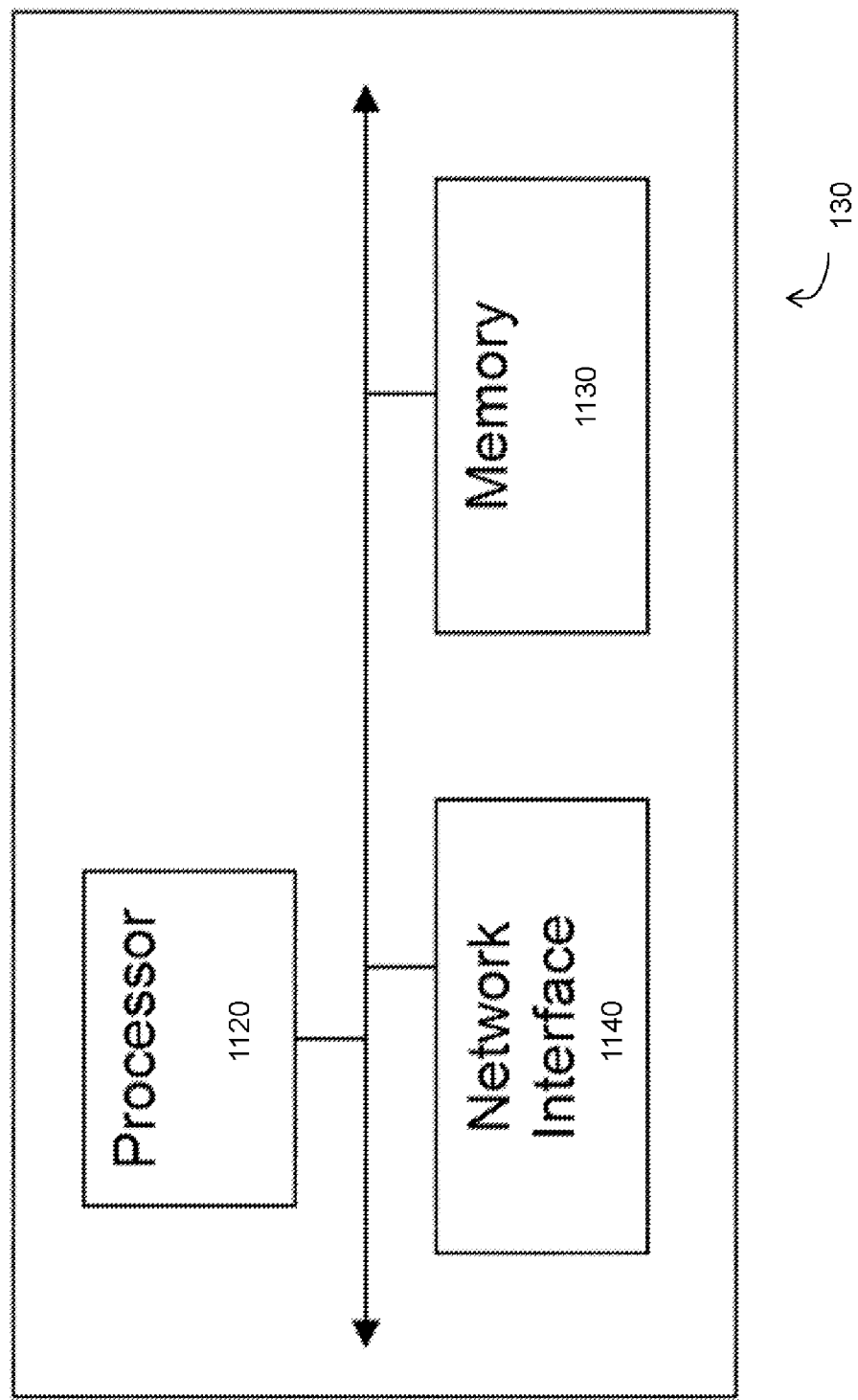
FIG. 11 is a block diagram illustrating certain embodiments of a packet core network node.

FIG. 11 is a block diagram illustrating certain embodiments of a radio network controller 120 or node in packet core network 130. Examples of network nodes can include a mobile switching center (MSC), a serving GPRS support node (SGSN), a mobility management entity (MME), a radio network controller (RNC), a base station controller (BSC), and so on. The network node includes processor 1120, memory 1130, and network interface 1140. In some embodiments, processor 1120 executes instructions to provide some or all of the functionality described above as being provided by the network node, memory 1130 stores the instructions executed by processor 1120, and network interface 1140 communicates signals to a suitable node, such as a gateway, switch, router, Internet, public switched telephone network (PSTN), network nodes 115, radio network controllers 120, node in packet core network 130, etc.

Processor 1120 may include any suitable combination of hardware and software implemented in one or more modules to execute instructions and manipulate data to perform some or all of the described functions of the network node. In some embodiments, processor 1120 may include, for example, one or more computers, one or more central processing units (CPUs), one or more microprocessors, one or more applications, and/or other logic.

Memory 1130 is generally operable to store instructions, such as a computer program, software, an application including one or more of logic, rules, algorithms, code, tables, etc. and/or other instructions capable of being executed by a processor. Examples of memory 1130 include computer memory (for example, random access memory (RAM) or read only memory (ROM)), mass storage media (for example, a hard disk), removable storage media (for example, a compact disk (CD) or a digital video disk (DVD)), and/or any other volatile or non-volatile, non-transitory computer-readable and/or computer-executable memory devices that store information.

In some embodiments, network interface 1140 is communicatively coupled to processor 1120 and may refer to any suitable device operable to receive input for the network node, send output from the network node, perform suitable processing of the input or output or both, communicate to other devices, or any combination of the preceding. Network interface 1140 may include appropriate hardware (e.g., port, modem, network interface card, etc.) and software, including protocol conversion and data processing capabilities, to communicate through a network.

Other embodiments of the network node may include additional components beyond those shown in FIG. 11 that may be responsible for providing certain aspects of the network node's functionality, including any of the functionality described above and/or any additional functionality (including functionality necessary to support the solution described above).

Figure 12:
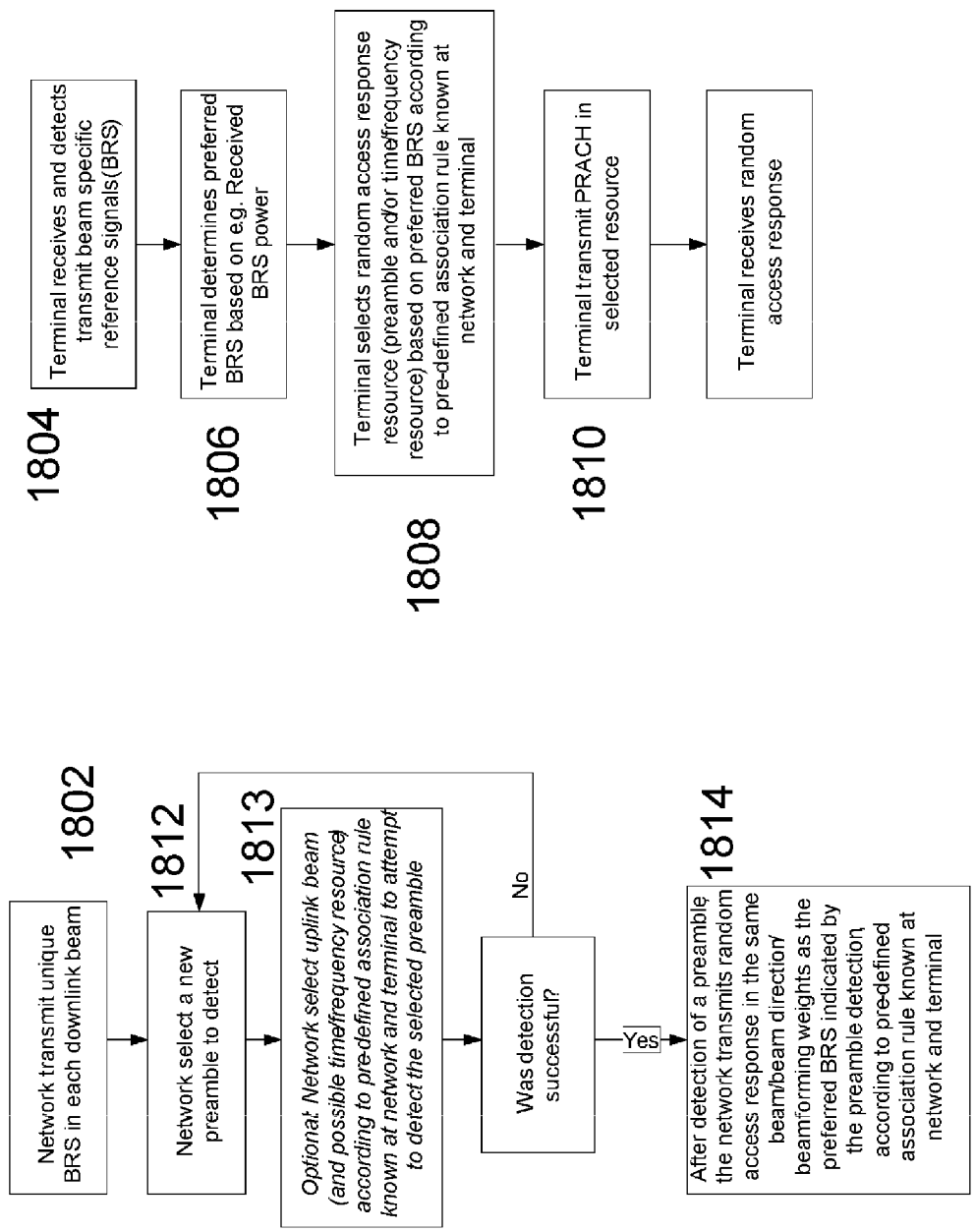
FIG. 12 is a flowchart illustrating certain embodiments for performing selection of a preferred downlink beam.

FIG. 12 illustrates a flowchart depicting exemplary method steps performed for the selection of a preferred downlink beam, according to certain embodiments. Specifically, the right side of the flowchart depicts the steps that may be performed by UE 110, and the left side depicts the steps that may be performed by a network node 115, according to certain embodiments.

The method may begin at step 1802 when network node 115 (eNB, base station) may transmit a set of beam formed reference signals in the downlink. The signals may be received by the UE at step 1804. UE 110 may then perform measurements on these different (preferably orthogonal) reference signals and then determine a preferred downlink beam at step 1806. This can be done by measuring the reference signal received power (RSRP) for each beam. The reference signal can be beam formed synchronization signals (PSS/SSS), beam formed channel state information signals (CSI-RS), beam formed discovery signals (DSS) or it can be newly designed beam reference signal sequences (BRS). In the following, we denote and classify the beam specific reference signals as BRS, for simplicity.

The beam specific reference signals are assumed known by specification or from broadcasted system information so that no dedicated configuration signaling is needed between network node 115 and UE 110, before the UE can start measuring and identifying the preferred downlink beam. However, in one embodiment, configuration signaling takes place prior to the identification but on non-beam-based legacy system such as LTE. (In practice, the UE detects a preferred beam specific RS from a set of beam specific RS, so the UE is not aware of the actual beam direction of beam radiation pattern, or beam forming weights used by the transmitted side which is entirely implementation specific).

At step 1808, terminal 110 selects random access response resource. In one embodiment, after determining a preferred downlink beam RS, the UE uses a function or look-up table, specified in a manual or standard or given by prior broadcast signaling or configured by dedicated signaling (such as RRC signaling) on an assisting legacy network, to select a random-access preamble from a set of preambles. The UE than uses this selected preamble in its random-access attempt in step 1810.

In a further embodiment, the PRACH resource (which is one of multiple resources distributed in time or frequency) to use when transmitting the preamble depends on the detected preferred BRS. Hence, the network will know which BRS was preferred from the UE side from which band the network has detected the preamble in the uplink. And thus, the network knows the direction in which to transmit the random-access response (MSG2) since it is the same as the preferred BRS. This embodiment can be combined with the previous, so that both a subset of preambles and a certain frequency band (and/or subframe), is used to transmit the preamble.

The network can then from detecting the PRACH preamble (at step 1812) determine which downlink beam the UE has found to be strongest and it will thus preferably use this when transmitting the random-access response message(s) at step 1814. The network has several choices in selecting the beam forming weights for the random access response messages. It can simply choose the same beam-forming weights as was used when forming the beam to transmit the BRS that was preferred by the UE. Alternatively, a wider bean or mere narrow beam or a beam with lower side lobes can be generated by using different beam forming weights for the following random-access response than for the BRS transmission. It may be so that BRS are transmitted with larger HPBW and PDSCH beams (like random-access responses) are transmitted in beams with smaller HPBW. In any case, the beam direction of the beam of the preferred BRS gives the network information of the pointing direction of the following random-access response beam (even though the beamforming weights are not exactly the same).

In one embodiment, the set of preambles and resources are divided into groups, where each group is associated with a beam specific reference signal (BRS). The association between BRS and preamble is thus given by standard specification. The UE randomly selects a preamble from the associated group to use in its random-access attempt. The group could for example be all available preamble sequences using one PRACH resource.

It may be a problem if the set of available preambles are divided into too many smaller groups, such that the number of preambles in each group is small since this may lead to larger probability of RACH collision. In a related embodiment, a set (more than one) of BRS are all associated with a group of PRACH preambles. At step 1813, the network can then use the set of BRS associated with the same group of PRACH preambles in adjacent downlink beams (adjacent in downlink transmitted beam direction). In case there are many BRS, then the set of available PRACH preambles associated with the detected best BRS is rather large so the preamble collision probability (in case of contention based random-access) is maintained low.

In yet a further variant of this embodiment, some BRS and preambles can be associated to multiple groups. The beam direction can be partly overlapped between two groups. If the preamble belong to the two groups are selected, the network node should use the overlapped BRS between these two groups to transmit the DL RACH response.

In a further network embodiment, the network only searches the subset of preambles in each uplink beam, for which the associated BRS is transmitted in downlink. Each BRS points out the subset of preambles to be used in PRACH preamble receiver. Hence, there is a reduction in network preamble detection complexity. This solution requires however that the relation between uplink receive beam and downlink transmit beam are known, by e.g. RF calibration at the network side.

In yet another embodiment, preamble sequences and PRACH resources are reused for BRSs associated with beams with sufficient angular separation so that they can be discriminated by using different uplink beams.

There is furthermore disclosed herein various additional example embodiments. Some such embodiments propose solutions for selecting a physical random access channel based on the strongest beam received in the downlink. In one example embodiment, user equipment may perform steps of:

Receiving and detecting transmit beam specific reference signals (BRS);
Determining a preferred BRS based on the received BRS power;
Selecting a random access response resource based on the preferred BRS;
Transmitting the physical random-access channel (PRACH) to a network node via the selected resource;
Optionally, selecting the random access response resource based on pre-defined association rules, known at the user equipment;
Optionally, the random access response resource is the preamble and/or time/frequency resource.

In another example embodiment, the network node may perform the steps of:

Transmitting unique BRS in each downlink beam;
Randomly selecting a new preamble to detect;
Selecting uplink beam according to pre-defined association rules known at network node;
Detecting the preamble;
Transmitting a random access response in the same beam/ beam direction/beamforming weights as the preferred BRS indicated by the preamble detection;
Optionally, selecting possible time/frequency resource according to the pre-defined association rule known at the network node;
Optionally, transmitting the random access response according to the pre-defined association rule known at the network node.

Other implementations may include a wireless communication device and/or access node configured to implement the described method, or a wireless communication system in which a wireless communication device and/or access node implement the described method.

Some embodiments of the disclosure may provide one or more technical advantages. For example, in certain embodiments, since the network knows the beam to use for the random access channel response, the coverage of the random access channel responses is improved. Another technical advantage may be that, the random access channel procedure can be completed earlier, which improves latency and reduces interference in the network. Another technical advantage may be that there is no need to have calibrated and aligned RF for uplink and downlink which reduces implementation cost and power consumption.

A further technical advantage may be that computational complexity in eNode is reduced. The physical random access channel preamble detector in eNode B only needs to search for a sub-set of sequences in each uplink receiver direction. This subset equals to those physical random access channel sequences that are mapped to the same downlink transmission beam (or spatial direction) as the receiver uplink beam (or spatial direction).

Some embodiments may benefit from some, none, or all of these advantages. Other technical advantages may be readily ascertained by one of ordinary skill in the art.

In particular example implementations, the proposed solutions may provide methods for random-access selection of a preferred downlink beam. In one example embodiment, user equipment may perform steps of:

Receiving and detecting transmit beam specific reference signals (BRS);
Determining a preferred BRS based on the received BRS power;
Selecting a random access response resource based on the preferred BRS;
Transmitting the physical random-access channel (PRACH) to a network noke via the selected resource;
Optionally, selecting the random access response resource based on pre-defined association rules, known at the user equipment;
Optionally, the random access response resource is the preamble and/or time/frequency resource.

In another example embodiment, the network node may perform the steps of:

Transmitting unique BRS in each downlink beam;
Randomly selecting a new preamble to detect;
Selecting uplink beam according to pre-defined association rules known at network node;
Detecting the preamble;
Transmitting a random access response in the same beam/ beam direction/beamforming weights as the preferred BRS indicated by the preamble detection;
Optionally, selecting possible time/frequency resource according to the pre-defined association rule known at the network node;
Optionally, transmitting the random access response according to the pre-defined association rule known at the network node.

Other implementations may include a wireless communication device and/or access node configured to implement the described method, or a wireless communication system in which a wireless communication device and/or access node implement the described method.

Some embodiments of the disclosure may provide one or more technical advantages. For example, in certain embodiments, since the network knows the beam to use for the random access channel response, the coverage of the random access channel responses is improved. Another technical advantage may be that, the random access channel procedure can be completed earlier, which improves latency and reduces interference in the network. Another technical advantage may be that there is no need to have calibrated and aligned RF for uplink and downlink which reduces implementation cost and power consumption.

A further technical advantage may be that computational complexity in eNode is reduced. The physical random access channel preamble detector in eNode B only needs to search for a sub-set of sequences in each uplink receiver direction. This subset equals to those physical random access channel sequences that are mapped to the same downlink transmission beam (or spatial direction) as the receiver uplink beam (or spatial direction).

Some embodiments may benefit from some, none, or all of these advantages. Other technical advantages may be readily ascertained by one of ordinary skill in the art.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:

1. A method in a wireless device for performing random access to a network node, the method comprising:
   receiving a set of downlink beam-specific reference signals (BRSs) from the network node;
   determining a preferred BRS based on the received signal power for each BRS in the set; and
   selecting, based on the preferred BRS, a random-access preamble for transmitting a random-access attempt to the network node according to one or more pre-defined association rules defining an association between a random-access resource and a BRS, the selecting using a function that uses the preferred BRS as an input and provides the selected random-access preamble as an output, the function being specified in a standard; and
   transmitting the selected random-access preamble to the network node, whereby the selection of the random-access preamble indicates to the network node which downlink beam is preferred by the wireless device to be used for downlink transmissions.

2. The method according to claim 1, wherein the selecting comprises using a function for selecting the random-access preamble from the set of preambles based on the BRS, the function specified in a standard, or given by prior broadcast signaling.

3. The method according to claim 1, wherein the selecting comprises selecting a time and/or frequency resource to be used for transmitting the random-access attempt.

4. The method according to claim 1, wherein the selecting comprises selecting the random-access preamble based on one or more pre-defined association rules known to the wireless device.

5. A method in a network node for supporting random access from a wireless device, the method comprising:
   transmitting a set of downlink beam-specific reference signals (BRSs);
   detecting a random-access preamble in a signal received from the wireless device, said preamble detection indicating a preferred BRS of the set of downlink BRS, the preferred BRS being preferred by said wireless device according to one or more pre-defined association rules defining an association between a random access resource and a BRS, wherein the random access preamble is based on a function that uses the preferred BRS as an input and provides the random-access preamble as an output, wherein the function is specified in a standard; and
   transmitting a random-access response in a same beam, and/or beam direction, and/or with same beamforming weights, as the preferred BRS indicated by the preamble detection.

6. The method according to claim 5, further comprising selecting an uplink beam for the detecting of the random-access preamble according to one or more pre-defined association rules between random-access preambles and uplink beams known at the network node.

7. The method according to claim 5, further comprising:
   selecting a time and/or frequency resource for random-access preamble detection according to one or more pre-defined association rules between random-access preambles and time/frequency resources known at the network node.

8. The method according to claim 5, wherein the transmitting further comprises:
   transmitting the random-access response according to the one or more pre-defined association rules known at the network node.

9. The method according to claim 5, wherein the detecting further comprises searching a subset of random-access preambles in each uplink beam for which subset an associated BRS is transmitted in downlink, each BRS pointing out a subset of random-access preambles to be searched.

10. The method according to claim 5, wherein random-access preamble sequences and resources are reused for BRSs associated with downlink beams having a pre-determined angular separation.

11. A wireless device configured to perform random access to a network node, the wireless device comprising a processor and a memory, the memory containing instructions executable by the processor to:
   receive a set of downlink beam-specific reference signals (BRSs) from the network node;
   determine a preferred BRS based on the received signal power for each BRS in the set; and
   select, based on the preferred BRS, a random-access preamble for transmitting a random-access attempt to the network node according to one or more pre-defined association rules defining an association between a random-access resource and a BRS, the selecting using a function that uses the preferred BRS as an input and provides the selected random-access preamble as an output, the function being specified in a standard; and
   transmit the selected random-access preamble to the network node, whereby the selection of the random-access preamble indicates to the network node which downlink beam is preferred by the wireless device to be used for downlink transmissions.

12. The wireless device according to claim 11, wherein the processor is further configured to:
use a function for selecting a random-access preamble from the set of preambles based on the BRS, the function specified in a manual or standard, or given by prior broadcast signaling.

13. The wireless device according to claim 11, wherein the processor is further configured to:
select a time and/or frequency resource to be used for transmitting the random-access attempt.

14. The wireless device according to claim 11, wherein the processor is further configured to:
select the random-access preamble based on one or more pre-defined association rules known to the wireless device.

15. A network node configured to support random access from a wireless device, the network node comprising a processor and a memory, the memory containing instructions executable by the processor to:
transmit a set of downlink beam-specific reference signals (BRSs);
detect a random-access preamble in a signal received from the wireless device, said preamble detection indicating a preferred BRS of the set of downlink BRS, the preferred BRS being preferred by said wireless device according to one or more pre-defined association rules defining an association between a random access resource and a BRS, wherein the random access preamble is based on a function that uses the preferred BRS as an input and provides the random-access preamble as an output, wherein the function is specified in a standard; and
transmit a random-access response in a same beam, and/or beam direction, and/or with same beamforming weights, as the preferred BRS indicated by the preamble detection.

16. The network node according to claim 15, wherein the processing means is further configured to:
select an uplink beam for detecting the random-access preamble according to one or more pre-defined association rules between random-access preambles and uplink beams known at the network node.

17. The network node according to claim 15, wherein the processing means is further configured to:
select a time and/or frequency resource for random-access preamble detection according to one or more pre-defined association rules between random-access preambles and time/frequency resources known at the network node.

18. The network node according to claim 15, wherein the processing means is further configured to:
transmit the random-access response according to the one or more pre-defined association rules known at the network node.

19. The network node according to claim 15, wherein the processing means is further configured to:
search a subset of random-access preambles in each uplink beam for which subset an associated BRS is transmitted in downlink, each BRS pointing out a subset of random-access preambles to be searched.

20. The network node according to claim 15, wherein random-access preamble sequences and resources are reused for BRSs associated with downlink beams having a pre-determined angular separation.

21. A wireless communication system comprising:
a wireless device and a network node, the network node operable to transmit a set of downlink beam-specific reference signals (BRSs) and the wireless device operable to:
receive the set of downlink BRSs from the network node;
determine a preferred BRS based on the received signal power for each BRS of the set of downlink BRSs;
select, based on the preferred BRS, a random-access preamble to be used to transmit a random-access attempt to the network node according to one or more pre-defined association rules defining an association between a random-access resource and a BRS, the selecting using a function that uses the preferred BRS as an input and provides the selected random-access preamble as an output, the function being specified in a standard; and
transmit the selected random-access preamble to the network node, whereby the selection of the random-access preamble indicates to the network node which downlink beam is preferred by the wireless device to be used for downlink transmissions;
the network node further operable to:
detect the preferred BRS of the wireless device based on the random-access preamble that the wireless device uses when transmitting the random-access attempt; and
transmit a random-access response in a same beam, and/or beam direction, and/or with same beamforming weights, as the preferred BRS.

* * * * *

UNITED STATES PATENT AND TRADEMARK OFFICE
CERTIFICATE OF CORRECTION

| | |
|---|---|
| PATENT NO. | : 11,751,238 B2 |
| APPLICATION NO. | : 17/009912 |
| DATED | : September 5, 2023 |
| INVENTOR(S) | : Frenne et al. |

It is certified that error appears in the above-identified patent and that said Letters Patent is hereby corrected as shown below:

In the Specification

In Column 2, Line 66, delete "radio" and insert -- Temporary Cell-radio --, therefor.

In Column 3, Line 14, delete "messages (HARQ ACK)." and insert -- (HARQ ACK) messages. --, therefor.

In Column 6, Lines 16-23, delete "The left hand side of the flowchart shown in FIG. 8 illustrates a method in a network node 115 for supporting random access from a wireless device 110. The method comprises transmitting 802 a set of beam-specific reference signals (BRS). The method also comprises detecting 820 a preamble in a signal received from the wireless device 110, said preamble detection indicating a BRS preferred by said wireless device." and insert the same at Line 15, after "transmissions." as a continuation paragraph.

In Column 6, Lines 24-27, delete "The method further comprises transmitting 814 a random-access response in the same be and/or beam direction, and/or with the same beamforming weights, as the preferred BRS indicated by the preamble detection." and insert the same at Line 23, after "device." as a continuation paragraph.

In Column 6, Line 41, delete "PSS/Secondary" and insert -- (PSS)/Secondary --, therefor.

In Column 6, Line 42, delete "SSS)," and insert -- (SSS)), --, therefor.

In Column 9, Line 4, delete "equipped" and insert -- equipment --, therefor.

In Column 9, Line 51, delete "RF" and insert -- radio --, therefor.

In Column 9, Line 52, delete "(RRH)/etc." and insert -- (RRH), etc. --, therefor.

In Column 10, Line 28, delete "and/or or" and insert -- and/or --, therefor.

Signed and Sealed this
Twenty-third Day of April, 2024

*Katherine Kelly Vidal*
Katherine Kelly Vidal
*Director of the United States Patent and Trademark Office*

CERTIFICATE OF CORRECTION (continued)
U.S. Pat. No. 11,751,238 B2

In Column 11, Line 48, delete "(including" and insert -- (including any --, therefor.

In Column 12, Line 22, delete "than" and insert -- then --, therefor.

In Column 12, Line 45, delete "bean or mere" and insert -- beam or more --, therefor.

In Column 14, Line 34, delete "noke" and insert -- node --, therefor.

In the Claims

In Column 15, Line 46, in Claim 1, delete "set; and" and insert -- set; --, therefor.

In Column 16, Line 24, in Claim 6, delete "comprising" and insert -- comprising: --, therefor.

In Column 16, Line 56, in Claim 11, delete "set; and" and insert -- set; --, therefor.